United States Patent
Cho et al.

(10) Patent No.: US 9,630,509 B2
(45) Date of Patent: Apr. 25, 2017

(54) APPARATUS AND METHOD FOR CONTROLLING VEHICLE HAVING MOTOR

(71) Applicant: Hyundai Motor Company, Seoul (KR)

(72) Inventors: Woocheol Cho, Daejeon (KR); Deok Keun Shin, Gyeonggi-do (KR); Teh Hwan Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,605

(22) Filed: Nov. 15, 2015

(65) Prior Publication Data

US 2017/0057361 A1   Mar. 2, 2017

(30) Foreign Application Priority Data

Aug. 26, 2015 (KR) .................. 10-2015-0120393

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 7/18 | (2006.01) |
| B60L 15/20 | (2006.01) |

(52) U.S. Cl.
CPC .............. B60L 7/18 (2013.01); B60L 15/20 (2013.01); *Y10S 903/905* (2013.01); *Y10S 903/906* (2013.01); *Y10S 903/907* (2013.01); *Y10S 903/947* (2013.01)

(58) Field of Classification Search
CPC ....... B60L 15/20; B60W 20/00; B60W 10/08; B60W 10/06; Y02T 10/6286; B60K 6/445

USPC ............................................................ 701/22
See application file for complete search history.

(56) References Cited

U.S. PATENT DOCUMENTS

| | | | |
|---|---|---|---|
| 2006/0055239 A1 | 3/2006 | Crombez et al. | |
| 2007/0046099 A1 | 3/2007 | Matsuura et al. | |

FOREIGN PATENT DOCUMENTS

| | | |
|---|---|---|
| EP | 0754588 A1 | 1/1997 |
| EP | 1205328 A2 | 5/2002 |
| EP | 2823985 A1 | 1/2015 |

OTHER PUBLICATIONS

Extended European Search Report for European Patent Application No. 15196255.2, dated Jan. 24, 2017, 10 pages.

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

An apparatus for controlling a vehicle having a motor is provided and includes a driving information sensor that senses driving information of the vehicle including an open value of an APS, an open value of a BPS, a driving wheel speed, a non-driving wheel speed, external temperature, battery temperature, a vehicle speed, and a shift stage. A driving motor generates a driving force and is operated as a power generator when the vehicle coasts to generate electric energy. An ABS that adjusts a braking force applied to a driving wheel. A controller changes a coast regeneration torque subject to regenerative braking by the driving motor when the vehicle is coasting, based on a difference between a driving wheel speed and a non-driving wheel speed, correction temperature determined based on the external temperature and the battery temperature, a friction coefficient of a road, and an operation condition of the ABS.

19 Claims, 5 Drawing Sheets

APPARATUS AND METHOD FOR CONTROLLING VEHICLE HAVING MOTOR

CROSS-REFERENCE TO RELATED APPLICATION

This application claims priority to and the benefit of Korean Patent Application No. 10-2015-0120393 filed in the Korean Intellectual Property Office on Aug. 26, 2015, the entire contents of which are incorporated herein by reference.

BACKGROUND (a) Field of the Invention

The present invention relates to an apparatus and a method for controlling a vehicle having a motor, and more particularly, to an apparatus and a method for controlling a vehicle having a motor capable of preventing the vehicle from rattling when an antilock brake system (ABS) is operated during regenerative braking.

(b) Description of the Related Art

Generally, an electric vehicle is a type of vehicle which may be driven using a power supply of a battery and may include a pure electric vehicle driven using the power supply of the battery and a hybrid electric vehicle using both of a traditional internal combustion engine and the power supply of the battery. The pure electric vehicle is driven by power of a driving motor operated by the power supply of the battery and the hybrid electric vehicle is driven by an efficient combination of the power of the internal combustion engine and the power of the driving motor.

Further, the hybrid electric vehicle is driven by the power of the motor and the engine and includes a starter and generator configured to start an engine or generate electricity by an output of the engine. In the vehicle having the motor like the pure electric vehicle and the hybrid electric vehicle, the motor and/or the starter and generator are operated as a generator to recover inertial energy upon coasting which drives the vehicle by inertia. When the motor is operated as the generator to recover inertial energy, the braking of the corresponding vehicle is required.

In other words, the inertial energy may be recovered as power generation power by setting a coasting torque (e.g., torque in an opposite direction to a driving direction or coast regeneration torque) based on a vehicle speed in the motor upon the coasting. Particularly, the braking is required. Further, in a hydraulic brake of a general vehicle, a braking hydraulic pressure is applied to a wheel by an operation of a brake pedal, to perform the braking. When a braking force greater than a static friction force between a road surface and a tire is applied to the tire, a slip phenomenon in which the tire slides on the road surface occurs.

Since a kinetic friction coefficient is less than the static friction coefficient, the slip phenomenon should be prevented to implement the optimal braking. Further, a handle locking phenomenon should be prevented upon the operation of the brake due to the slip phenomenon. Therefore, an antilock brake system (ABS) has been used to prevent the slip phenomenon or the handle locking phenomenon from occurring and secure the stabilized braking force, by adjusting the braking hydraulic pressure applied to hydraulic pressure brakes of each wheel.

The ABS includes hydraulic pressure control apparatuses such as a plurality of solenoid valves, an accumulator, and a hydraulic pressure pump configured to adjust the braking hydraulic pressure transferred to each hydraulic pressure brake side and an electric controller (ECU) configured to operate the various electric/electronic components. The ABS is configured to reduce, maintain, or increase the braking hydraulic pressure by sensing a slip of a wheel occurring due to rapid braking of the vehicle or a brake operation on a slide surface, thereby securing an appropriate cornering force and stopping the vehicle at a shortest distance while maintaining steering stability.

Meanwhile, like a general vehicle, the ABS apparatus has been used even in the electric vehicle using the motor as the driving source or the hybrid vehicle using the motor and the engine as the driving source. Generally, the latest trend is to greatly set the coast regeneration torque to increase an energy recovery rate when the vehicle is coasting. However, when a friction coefficient of a road such as a snowy road, an icy road, and a rainy road is minimal, the slip may occur in the driving wheel due to the coast regeneration torque. The driving stability of the vehicle may deteriorate due to the slip. Accordingly, when the slip occurs in the driving wheel due to the coast regeneration torque and thus the ABS is operated, the coast regeneration torque is set to be "0". However, since the operation and the non-operation of the ABS are repeatedly generated, the control method may cause the coast regeneration torque to be repeatedly applied or may not be applied. Therefore, rattling of the vehicle may occur.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling a vehicle having a motor capable of preventing the vehicle from rattling based on whether a coast regeneration torque is applied, when the vehicle is driving on a road having a minimal friction coefficient.

An exemplary embodiment of the present invention provides an apparatus for controlling a vehicle having a motor that may include: a driving information sensing unit configured to sense driving information of the vehicle including an open value of an accelerator position sensor (APS), an open value of a brake position sensor (BPS), a speed of a driving wheel, a speed of a non-driving wheel, external temperature, battery temperature, a vehicle speed, and a shift stage; a driving motor configured to generate a driving force and operated as a power generator when the vehicle is coasting to generate electric energy; an ABS configured to adjust a braking force applied to a driving wheel; and a controller configured to adjust a coast regeneration torque subject to regenerative braking by the driving motor when the vehicle is coasting, based on a difference between a speed of a driving wheel and a speed of a non-driving wheel sensed by the driving information sensing unit, correction temperature determined based on the external temperature and the battery temperature, a friction coefficient of a road, and an operation condition of the ABS.

The controller may be configured to reduce the coast regeneration torque more than a targeted coast regeneration torque determined by the vehicle speed and the shift stage, based on the speed difference, when the difference between the speed of the driving wheel and the speed of the non-driving wheel is greater than a set speed. The controller may be configured to increase the coast regeneration torque to have a first slope up to a first coast regeneration torque set based on the correction temperature when a wheel slip is reduced after the operation of the ABS and thus the ABS is not operated.

Additionally, the controller may be configured to increase the coast regeneration torque to have a slope less than the first slope up to the targeted coast regeneration torque determined by the current vehicle speed and the shift stage when the coast regeneration torque reaches the first coast regeneration torque and may be configured to calculate a friction coefficient of a road. The controller may further be configured to calculate the friction coefficient of the road from a load applied to a front wheel, a dynamic radius of a tire, and the cost regeneration torque. The friction coefficient of the road may be calculated by an equation of coast regeneration torque/(load applied to front wheel*dynamic radius of tire).

The controller may be stored with a friction coefficient map based on the friction coefficient of the road and a wheel slip ratio which is the difference between the speed of the driving wheel and the speed of the non-driving wheel and the controller may be configured to calculate the friction coefficient of the road based on the speed of the driving wheel and the speed of the non-driving wheel sensed by the driving information sensing unit. The controller may be configured to increase the coast regeneration torque to have a second slope up to a second coast regeneration torque set based on the friction coefficient of the road. The controller may further be configured to increase the coast regeneration torque to have a slope less than the second slope up to the targeted coast regeneration torque determined by a current vehicle speed and the shift stage when the coast regeneration torque reaches the second coast regeneration torque. The controller may be configured to set the coast regeneration torque to be "0" when the ABS is operated.

Another exemplary embodiment of the present invention provides a method for controlling a vehicle having a motor that may include: sensing driving information of the vehicle including an open value of an APS, an open value of a BPS, a speed of a driving wheel, a speed of a non-driving wheel, external temperature, battery temperature, a vehicle speed, and a shift stage; determining whether the vehicle is in a coasting state based on the driving information of the vehicle; calculating a difference between a speed of a driving wheel and a speed of a non-driving wheel; and changing the coast regeneration torque based on the speed difference when the speed difference is greater than a set speed. When the difference between the speed of the driving wheel and the speed of the non-driving wheel is greater than a set speed, the coast regeneration torque may be reduced more than a targeted coast regeneration torque determined by the vehicle speed and the shift stage, based on the speed difference.

The method may further include: determining whether an ABS is operated; and setting the coast regeneration torque to be "0" when the ABS is operated. Additionally, method may include: determining whether a friction coefficient of a road is calculated, when the ABS is not operated; increasing the coast regeneration torque to have a first slope up to a set first coast regeneration torque based on correction temperature calculated from external temperature and battery temperature, when the friction coefficient of the road is not calculated; and increasing the coast regeneration torque to have a slope less than the first slope up to the targeted coast regeneration torque determined by a current vehicle speed and the shift stage when the coast regeneration torque reaches the first coast regeneration torque.

The method may further include: calculating the friction coefficient of the road from a load applied to a front wheel, a dynamic radius of a tire, and the cost regeneration torque; and changing the coast regeneration torque based on the calculated friction coefficient of the road. The friction coefficient of the road may be calculated by an equation of coast regeneration torque/(load applied to front wheel*dynamic radius of tire).

In addition, the method may include: previously storing a friction coefficient map based on the friction coefficient of the road and a wheel slip ratio which is the difference between the speed of the driving wheel and the speed of the non-driving wheel in a controller and calculating the friction coefficient of the road stored in the friction coefficient map based on the speed of the driving wheel and the speed of the non-driving wheel sensed by the driving information sensing unit; and changing the coast regeneration torque based on the calculated friction coefficient of the road.

The method may further include: increasing the coast regeneration torque to have a second slope up to a second coast regeneration torque set based on the friction coefficient of the road; and increasing the coast regeneration torque to have a slope less than the second slope up to the targeted coast regeneration torque determined by a current vehicle speed and the shift stage when the coast regeneration torque reaches the second coast regeneration torque. The second coast regeneration torque may be set to be decreasing as the friction coefficient of the road is reduced.

As described above, according to an exemplary embodiment of the present invention, the apparatus and method for controlling a vehicle having a motor may change the coast regeneration torque based on the external temperature, the operation of the ABS, and the friction coefficient of the road to prevent the vehicle from rattling when the vehicle is coasting on the road having the minimal friction coefficient.

BRIEF DESCRIPTION OF THE DRAWINGS

Since the accompanying drawings are provided only to describe exemplary embodiments of the present invention, it is not to be interpreted that the spirit of the present invention is limited to the accompanying drawings.

DETAILED DESCRIPTION

Figure 1:
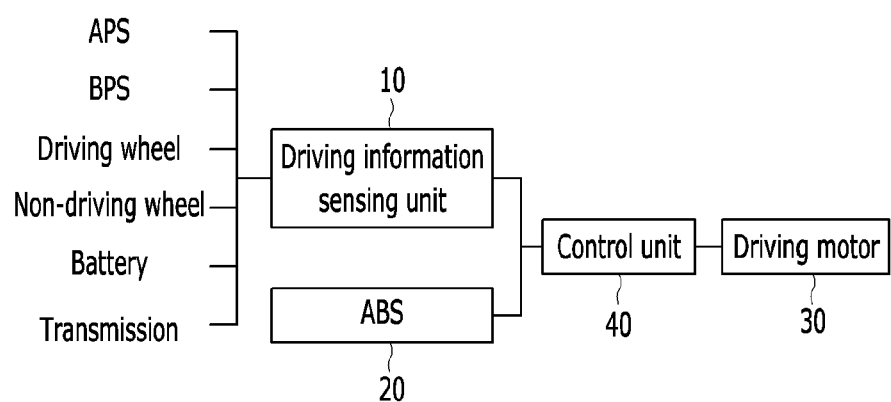
FIG. 1 is a diagram illustrating a configuration of an apparatus for controlling a vehicle having a motor according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Portions unrelated to the description will be omitted in order to obviously describe the present invention, and similar components will be denoted by the same reference numerals throughout the present specification. Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

Hereinafter, an apparatus for controlling a vehicle having a motor according to an exemplary embodiment of the present invention will be described in detail with reference to the accompanying drawings.

FIG. 1 is a diagram illustrating a configuration of an apparatus for controlling a vehicle having a motor according to an exemplary embodiment of the present invention. As illustrated in FIG. 1, an apparatus for controlling a vehicle having a motor may include a driving information sensing unit 10 configured to sense a driving state of the vehicle, a driving motor 30 configured to generate a driving torque and operated as a power generator when the vehicle is coasting to generate electric energy, an ABS 20 configured to adjust a braking force applied to a driving wheel, and a controller 40 configured to adjust a coast regeneration torque subjected to regenerative braking through the driving motor 30 based on driving information sensed by the driving information sensing unit 10. The controller 40 may be configured to operate the various components of the apparatus.

In particular, the driving information sensing unit 10 (e.g., a sensor) may be configured to sense driving information of the vehicle including an open value of an acceleration position sensor (APS), an open value (e.g., an engagement amount or degree) of a brake position sensor (BPS), a speed of a driving wheel, a speed of a non-driving wheel, external temperature, battery temperature, a vehicle speed, and a shift stage and provide the sensed driving information to the controller 40. The driving information sensing unit 10 may include a wheel speed sensor configured to sense the speed of the driving wheel and the speed of the non-driving wheel, a temperature sensor configured to sense the external temperature, a battery temperature sensor configured to sense the battery temperature, and a vehicle speed sensor or the wheel speed sensor configured to sense the vehicle speed.

The driving motor 30 may be configured to generate a driving torque required to drive the vehicle by electric energy supplied from the battery. Further, the driving motor 30 may be operated as the power generator when the vehicle is coasting to generate electric energy, and the generated energy may be stored in the battery. The controller 40 may be implemented as at least one processor operated by a predetermined program which executes each step of a method for controlling a vehicle having a motor according to the exemplary embodiment of the present invention.

The cost regeneration torque is a torque applied in an opposite direction to a driving direction of the vehicle when both of the open values of the accelerator pedal and a brake pedal are in a "0" state (e.g., coasting state) and indicates a torque that recovers inertial energy as a generated output by operating the driving motor 30 as the power generator. Generally, the coast regeneration torque may be set based on the vehicle speed and the shift stage. Hereinafter, the coast regeneration torque set by the vehicle speed and the transmission is referred to as a targeted coast regeneration torque.

The controller 40 may be configured to change the coast regeneration torque subject to the regenerative braking by the driving motor 30, based on correction temperature determined based on the external temperature and the battery temperature sensed by the driving information sensing unit 10, a friction coefficient of a road calculated from a slip state of the vehicle determined based on the difference between the speed of the driving wheel and the speed of the non-driving wheel, and an operation state of the ABS 20. When the ABS 20 is not operated, the controller 40 may be configured to change the coast regeneration torque based on the difference between the speed of the driving wheel and the speed of the non-driving wheel. In particular, the greater the speed difference, the smaller the coast regeneration torque.

When the difference between the speed of the driving wheel and the speed of the non-driving wheel is greater than the set speed, the ABS 20 may be operated to adjust a braking hydraulic pressure transferred to a hydraulic pressure brake. Accordingly, when the ABS 20 is operated by adjusting the difference between the speed of the driving wheel and the speed of the non-driving wheel to be greater than the set speed, a slip of a driving shaft wheel may be substantial due to the coast regeneration torque. Therefore, when the ABS 20 is operated, the coast regeneration torque may be set to be "0".

When the wheel slip is reduced after the operation of the ABS 20 and thus the operation of the ABS stops, the controller 40 may be configured to increase the coast regeneration torque to have a first slope up to a first coast regeneration torque set based on the correction temperature. Further, the controller 40 may be configured to increase the coast regeneration torque to have a slope less than the first slope up to the targeted coast regeneration torque determined by a current vehicle speed and the shift stage when the coast regeneration torque reaches the first coast regeneration torque and calculate the friction coefficient of the road.

In particular, the first coast regeneration torque is a coast regeneration torque at which the wheel slip is not generated based on the correction temperature, and the value thereof may be determined by experiment. For example, when the correction temperature is a sub-zero temperature, the first coast regeneration torque may be set to be about 200 N·m at which the wheel slip is not generated based on an icy road condition. The correction temperature may be determined based on the external temperature and the battery temperature. For example, the correction temperature may be determined by adding a value obtained by multiplying a first weight value by the external temperature to a value obtained by multiplying a second weight value by the battery temperature. In particular, the second weight value may be set to be greater than the first weight value.

Generally, since specific heat of the battery is substantial (e.g., greater than a particular value), the change in the battery temperature may be minimal as the external temperature changes. Therefore, to more accurately predict a state of a road (e.g., friction coefficient of a road), the friction coefficient of the road may be predicted based on the correction temperature using the external temperature and the battery temperature. For example, when the correction temperature is a sub-zero temperature, the road may be determined to be in the icy road state and the friction coefficient of the road may be assumed to be about 0.1. Further, when the targeted coast regeneration torque is determined as about 500 N·m by the current vehicle speed and the transmission, the first coast regeneration torque at which the wheel slip does not occur in the sub-zero state may be determined.

For example, the first coast regeneration torque may be determined as a value (e.g., about 100 N·m) obtained by multiplying the targeted coast regeneration torque by a friction coefficient of about 0.1. The controller 40 may be configured to increase the coast regeneration torque to have a first slope having a sudden slope increase (e.g., a steep increase) to the first coast regeneration torque. Further, when the coast regeneration torque reaches the first coast regeneration torque, the coast regeneration torque may be smoothly increased to have a slope less than the first slope up to the targeted coast regeneration torque. In particular, the controller 40 may be configured to calculate a friction coefficient (c) of a road from a load (w) applied to a front wheel, a dynamic radius (r) of a tire, and a cost regeneration torque (RT). In other words, the friction coefficient of the road is calculated by the following Equation.

$$c = RT/(w*r) \qquad \text{Equation 1}$$

Alternatively, the controller 40 may be previously stored with a friction coefficient map based on the friction coefficient of the road and the wheel slip ratio, and the controller 40 may be configured to calculate the wheel slip ratio based on the speed of the driving wheel and the speed of the non-driving wheel sensed by the driving information sensing unit 10, in which the friction coefficient of the road for the calculated wheel slip ratio may be extracted from the friction coefficient map. In particular, the wheel slip ratio is a ratio (speed of driving wheel/speed of non-driving wheel) of the speed of the non-driving wheel to the speed of the driving wheel.

Accordingly, when the friction coefficient of the road is calculated, the controller 40 may be configured to change the coast regeneration torque based on the friction coefficient of the road. In particular, the smaller the friction coefficient of the road, the smaller the coast regeneration torque. Further, the controller 40 may be configured to calculate the second coast regeneration torque based on the targeted coast regeneration torque determined by the current vehicle speed and the shift stage and the friction coefficient of the road. Particularly, the second coast regeneration torque is the coast regeneration torque at which the wheel slip is not generated based on the friction coefficient of the road, and the value thereof may be determined by experiment. The second coast regeneration torque may be set to decrease as the friction coefficient of the road is reduced.

Additionally, the controller 40 may be configured to suddenly (e.g., rapidly) increase the coast regeneration torque to have a second slope up to the second coast regeneration torque. The controller 40 may also be configured to smoothly increase the coast regeneration torque to have a slope less than the second slope up to the targeted coast regeneration torque determined by the current vehicle speed and the shift stage when the coast regeneration torque reaches the second coast regeneration torque.

Hereinafter, a method for controlling a vehicle having a motor according to an exemplary embodiment of the present invention will be described in detail with reference to the accompanying drawings.

Figure 2:
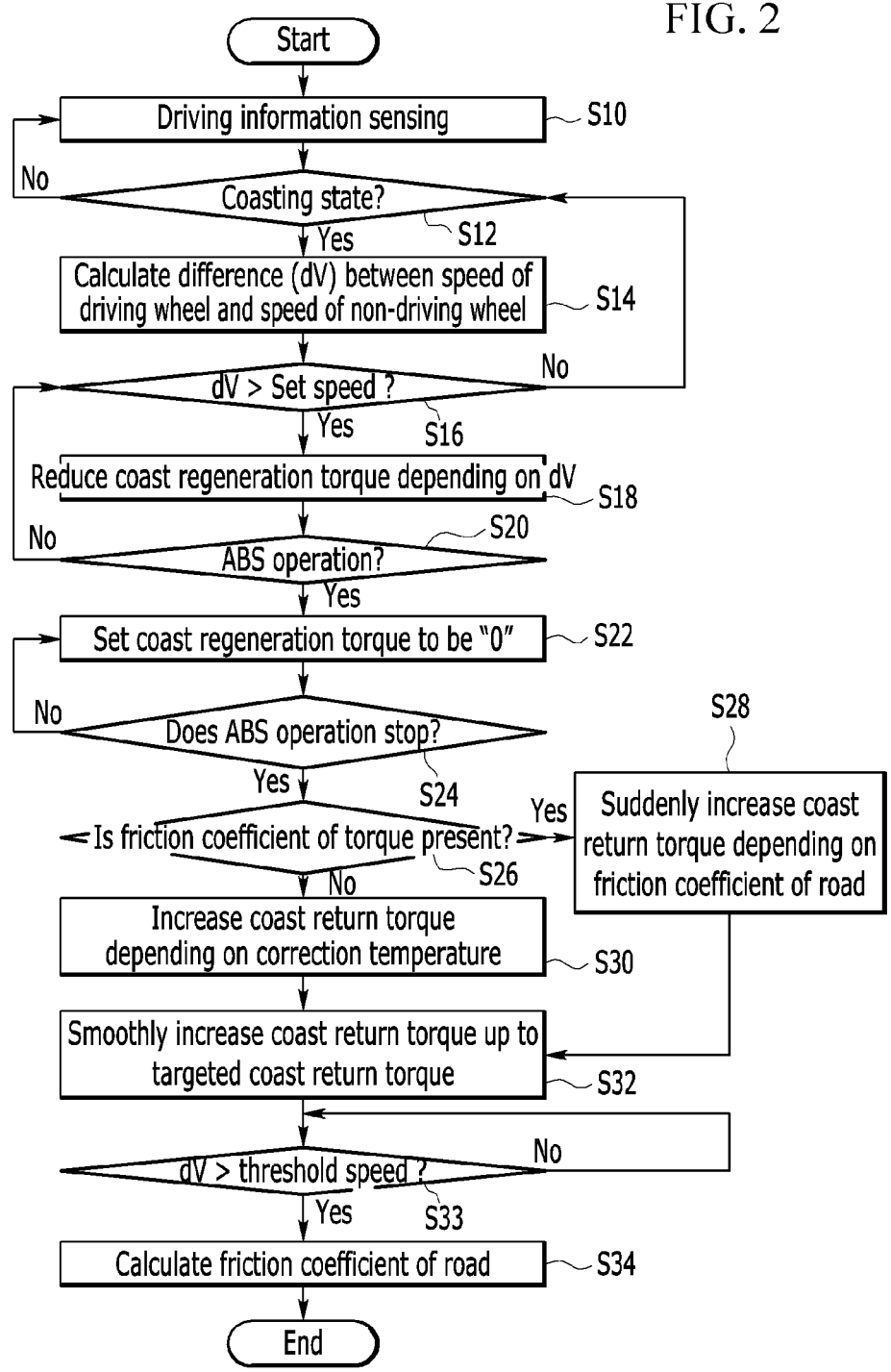
FIG. 2 is a flow chart illustrating a method for controlling a vehicle having a motor according to an exemplary embodiment of the present invention.
Figure 3:
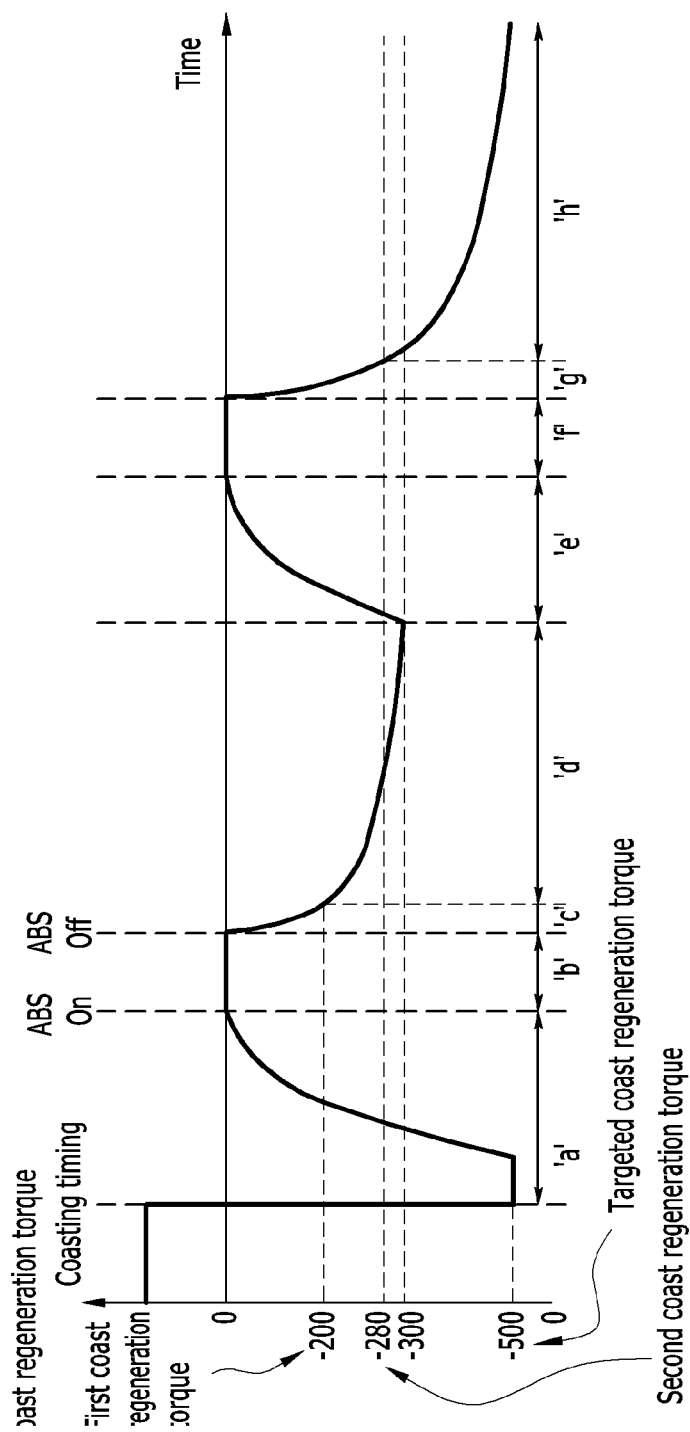
FIG. 3 is a graph illustrating a change in a coast regeneration torque over time according to an exemplary embodiment of the present invention.
Figure 4A:
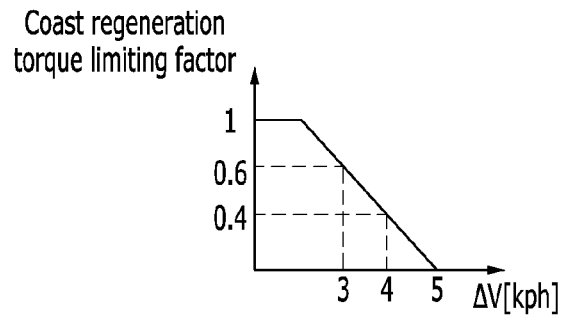
FIGS. 4A and 4B are graphs illustrating a relationship between a difference between a speed of a driving wheel and a speed of a non-driving wheel and the coast regeneration torque according to the exemplary embodiment of the present invention.
Figure 4B:
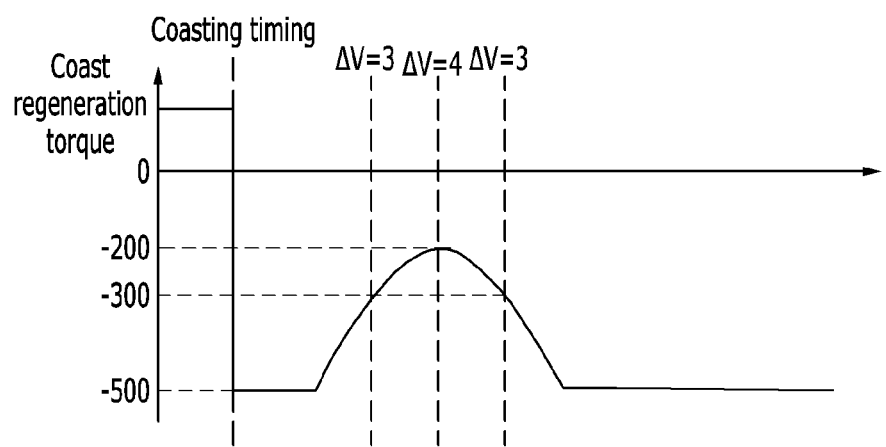

FIG. 2 is a flow chart illustrating a method for controlling a vehicle having a motor according to an exemplary embodiment of the present invention. FIG. 3 is a graph illustrating a change in a coast regeneration torque over time according to an exemplary embodiment of the present invention. FIGS. 4A and 4B are graphs illustrating a relationship between a difference between a speed of a driving wheel and a speed of a non-driving wheel and the coast regeneration torque according to the exemplary embodiment of the present invention.

Referring to FIGS. 2 to 4B, the driving information sensing unit 10 may be configured to sense the driving information of the vehicle including the open value of the APS, the open value of the BPS, the speed of the driving wheel, the speed of the non-driving wheel, the external temperature, the battery temperature, the vehicle speed, and the shift stage (S10). The sensed driving information may be provided to the controller 40.

The controller 40 may be configured to determine whether the vehicle is in a coasting state based on the driving information of the vehicle (S12). In particular, when both the opening of the APS and the opening of the BPS is "0", the controller may be configured to determine that the vehicle is in the coasting state. In other words, on the controller may be configured to determine that the accelerator pedal and the brake pedal are disengaged (e.g., no pressure is exerted onto the pedals) and the vehicle is in the coasting state. The controller 40 may then be configured to calculate the difference between the speed of the driving wheel and the speed of the non-driving wheel (S14).

When the speed difference is greater than the set speed (S16), the controller 40 may be configured to change the coast regeneration torque based on the speed difference (S18). In other words, the controller 40 may be configured to reduce the coast regeneration torque more based on the speed difference than the targeted coast regeneration torque determined by the vehicle speed and the shift stage (see section 'a' of FIG. 3).

For the detailed description, referring to FIGS. 4A and 4B, when the speed difference is about 3 kph, a coast regeneration torque limiting factor may be about 0.6. In particular, when the targeted coast regeneration torque is about 500 N·m, the coast regeneration torque may be determined as a value (e.g., about 300 N·m) obtained by multiplying a limiting coefficient of 0.6 by the targeted coast regeneration torque (500 N·m). Further, when the speed difference is about 4 kph, the coast regeneration torque limiting coefficient may be about 0.4. In particular, when the targeted coast regeneration torque is about 500 N·m, the coast regeneration torque may be determined as a value (e.g., 200 N·m) obtained by multiplying a limiting coefficient of 0.4 by the targeted coast regeneration torque (500 N·m).

The controller 40 may further be configured to determine whether the ABP 20 is operated (S20). When the ABS 20 is operated, the controller 40 may be configured to set the coast regeneration torque to be "0" (see section 'b' of FIG. 3) (S22). Further, when the operation of the ABS 20 stops (S24), the controller 40 may be configured to determine whether the friction coefficient of the road is previously calculated (S26). When the friction coefficient of the road is not previously calculated, the controller 40 may be configured to suddenly increase the coast regeneration torque to have the first slope up to the set first coast regeneration torque based on the correction temperature calculated based on the external temperature and the battery temperature (see section 'c' of FIG. 3) (S30). In particular, the first coast regeneration torque is the coast regeneration torque at which the wheel slip is not generated, which is the same as described above.

When the coast regeneration torque reaches the first coast regeneration torque, the controller 40 may be configured smoothly increase the coast regeneration torque to have a slope less than the first slope up to the targeted coast regeneration torque determined by the current vehicle speed and the shift stage (see section 'd' of FIG. 3) (S32). In the section 'd.' of FIG. 3, the wheel slip may occur, but the coast regeneration torque may be increased to recover the energy by the coasting.

In addition, when the wheel slip occurs in the section 'd.' of FIG. 3 and a speed difference dV between the driving wheel and the non-driving wheel is greater than a threshold speed (S33), the controller 40 may be configured to calculate the friction coefficient of the road (S34). The detailed method for calculating a friction coefficient of a road is as described above. When the difference between the speed of the driving wheel and the speed of the non-driving wheel is insufficient (e.g., less than a particular value), it may be difficult to accurately calculate the friction coefficient of the road. Therefore, when the difference between the speed of the driving wheel and the speed of the non-driving wheel is greater than the threshold speed, the friction coefficient of the road may be more accurately calculated by obtaining the friction coefficient of the road.

Furthermore, when the difference between the speed of the driving wheel and the non-driving wheel is greater than the set speed, the controller 40 may be configured to reduce the coast regeneration torque based on the speed difference (see section 'e' of FIG. 3). When the ABS 20 is operated, the controller 40 may be configured to set the coast regeneration torque to be "0" (see section 'f' of FIG. 3). When the operation of the ABS 20 stops (S24), the controller 40 may be configured to determine whether the friction coefficient of the road is present (S26). Since the friction coefficient of the road is calculated in step S34, the controller 40 may be configured to suddenly increase the coast regeneration torque to have a second slope up to the second coast regeneration torque set based on the friction coefficient of the road (see section 'g' of FIG. 3) (S28).

In particular, the second coast regeneration torque is the coast regeneration torque at which the wheel slip is not generated based on the friction coefficient of the road, which may be determined by experiment based on the friction coefficient. When the coast regeneration torque reaches the second coast regeneration torque, the controller 40 may be configured to more smoothly increase the coast regeneration torque to have a slope less than the second slope up to the targeted coast regeneration torque determined by the current vehicle speed and the shift stage (S32) (see section 'h' of FIG. 3).

In the section 'h' of FIG. 3, the wheel slip may occur, but the coast regeneration torque may be increased to recover the energy by the coasting. Particularly, when the wheel slip occurs in section 'h' of FIG. 3, the controller 40 may be configured to calculate the friction coefficient of the road (S34). The calculated friction coefficient may be displayed via a cluster of the vehicle and thus the road state may be provided to the driver.

As described above, the coast regeneration torque may be changed based on the difference between the speed of the driving wheel and the speed of the non-driving wheel to prevent the ABS 20 from being frequently operated and the vehicle from rattling. Further, the coast regeneration torque may be set to be "0" when the ABS 20 is operated, thereby preventing the wheel slip from being increased.

Further, when the operation of the ABS 20 stops, using the correction temperature, the coast regeneration torque may be suddenly increased up to the first coast regeneration torque at which the wheel slip is not generated and then the coast regeneration torque may be increased more smoothly, thereby calculating the friction coefficient of the road. When the friction coefficient of the road is calculated, using the calculated friction coefficient, the coast regeneration torque may be suddenly increased up to the second coast regeneration torque at which the wheel slip does not occur and then the coast regeneration torque may be increased more smoothly, thereby preventing the ABS 20 from being frequently operated.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: Driving information sensing unit
20: ABS

30: Driving motor
40: Control unit (controller)

What is claimed is:

1. An apparatus for controlling a vehicle having a motor, comprising:
   a driving information sensing unit configured to sense driving information of the vehicle including an open value of an accelerator position sensor (APS), an open value of a brake position sensor (BPS), a speed of a driving wheel, a speed of a non-driving wheel, external temperature, battery temperature, a vehicle speed, and a shift stage;
   a driving motor configured to generate a driving force and operated as a power generator when the vehicle is coasting to generate electric energy;
   an antilock brake system (ABS) configured to adjust a braking force applied to a driving wheel; and
   a controller configured to change a coast regeneration torque subject to regenerative braking by the driving motor when the vehicle is coasting, based on a difference between a speed of a driving wheel and a speed of a non-driving wheel sensed by the driving information sensing unit, correction temperature determined based on the external temperature and the battery temperature, a friction coefficient of a road, and an operation condition of the ABS.

2. The apparatus of claim 1, wherein the controller is configured to reduce the coast regeneration torque more than a targeted coast regeneration torque determined by the vehicle speed and the shift stage, based on the speed difference, when the difference between the speed of the driving wheel and the speed of the non-driving wheel is greater than a set speed.

3. The apparatus of claim 1, wherein the controller is configured to increase the coast regeneration torque to have a first slope up to a first coast regeneration torque set based on the correction temperature when a wheel slip is reduced after the operation of the ABS and thus the ABS is not operated.

4. The apparatus of claim 3, wherein the controller is configured to increase the coast regeneration torque to have a slope less than the first slope up to the targeted coast regeneration torque determined by the current vehicle speed and the shift stage when the coast regeneration torque reaches the first coast regeneration torque and calculate the friction coefficient of the road.

5. The apparatus of claim 4, wherein the controller is configured to calculate the friction coefficient of the road from a load applied to a front wheel, a dynamic radius of a tire, and the cost regeneration torque.

6. The apparatus of claim 5, wherein the friction coefficient of the road is calculated by an equation of coast regeneration torque/(load applied to front wheel*dynamic radius of tire).

7. The apparatus of claim 4, wherein:
   the controller is stored with a friction coefficient map based on the friction coefficient of the road and a wheel slip ratio which is the difference between the speed of the driving wheel and the speed of the non-driving wheel, and
   the controller is configured to calculate the friction coefficient of the road from the speed of the driving wheel and the speed of the non-driving wheel sensed by the driving information sensing unit.

8. The apparatus of claim 7, wherein the controller is configured to increase the coast regeneration torque to have a second slope up to a second coast regeneration torque set based on the friction coefficient of the road.

9. The apparatus of claim 8, wherein the controller is configured to increase the coast regeneration torque to have a slope less than the second slope up to the targeted coast regeneration torque determined by a current vehicle speed and the shift stage when the coast regeneration torque reaches the second coast regeneration torque.

10. The apparatus of claim 1, wherein the controller is configured to set the coast regeneration torque to be "0" when the ABS is operated.

11. A method for controlling a vehicle having a motor, comprising:
    sensing, by a driving information sensing unit, driving information of the vehicle including an open value of an accelerator position sensor (APS), an open value of a brake position sensor (BPS), a speed of a driving wheel, a speed of a non-driving wheel, external temperature, battery temperature, a vehicle speed, and a shift stage;
    determining, by a controller, whether the vehicle is in a coasting state based on the driving information of the vehicle;
    calculating, by the controller a difference between a speed of a driving wheel and a speed of a non-driving wheel; and
    adjusting, by an antilock brake system (ABS) a braking force applied to a driving wheel; and
    changing, by the controller, the coast regeneration torque based on the speed difference when the speed difference between a speed of a driving wheel and a speed of a non-driving wheel sensed by the sensing unit is greater or larger than a set speed, a correction temperature determined based on the external temperature and the battery temperature, a friction coefficient of a road, and an operation condition of the ABS.

12. The apparatus of claim 11, wherein when the difference between the speed of the driving wheel and the speed of the non-driving wheel is greater than a set speed, the coast regeneration torque is reduced more than a targeted coast regeneration torque determined by the vehicle speed and the shift stage, based on the speed difference.

13. The method of claim 11, further comprising: determining, by the controller, whether the antilock brake system (ABS) is operated; and setting, by the controller, the coast regeneration torque to be "0" when the ABS is operated.

14. The method of claim 13, further comprising: determining, by the controller, whether the friction coefficient of a road is calculated, when the ABS is not operated; increasing, by the controller, the coast regeneration torque to have a first slope up to a set first coast regeneration torque based on correction temperature calculated from external temperature and battery temperature, when the friction coefficient of the road is not calculated; and increasing, by the controller, the coast regeneration torque to have a slope less than the first slope up to the targeted coast regeneration torque determined by a current vehicle speed and the shift stage when the coast regeneration torque reaches the first coast regeneration torque.

15. The method of claim 14, further comprising:
    calculating, by the controller, the friction coefficient of the road from a load applied to a front wheel, a dynamic radius of a tire, and the cost regeneration torque; and
    changing, by the controller, the coast regeneration torque based on the calculated friction coefficient of the road.

16. The method of claim 15, wherein: the friction coefficient of the road is calculated by an equation of coast regeneration torque/(load applied to front wheel*dynamic radius of tire).

17. The method of claim 14, further comprising:
previously storing a friction coefficient map based on the friction coefficient of the road and a wheel slip ratio which is the difference between the speed of the driving wheel and the speed of the non-driving wheel in the controller and calculating, by the controller, the friction coefficient of the road stored in the friction coefficient map based on the speed of the driving wheel and the speed of the non-driving wheel sensed by the driving information sensing unit; and
changing, by the controller, the coast regeneration torque based on the calculated friction coefficient of the road.

18. The method of claim 17, further comprising:
increasing, by the controller, the coast regeneration torque to have a second slope up to a second coast regeneration torque set based on the friction coefficient of the road; and
increasing, by the controller, the coast regeneration torque to have a slope less than the second slope up to the targeted coast regeneration torque determined by a current vehicle speed and the shift stage when the coast regeneration torque reaches the second coast regeneration torque.

19. The method of claim 18, wherein: the second coast regeneration torque is set to decrease as the friction coefficient of the road is reduced.

* * * * *